Dec. 28, 1926.
F. D. BARNES
1,612,691
DISPLAY DEVICE
Filed Feb. 23, 1926   2 Sheets-Sheet 1
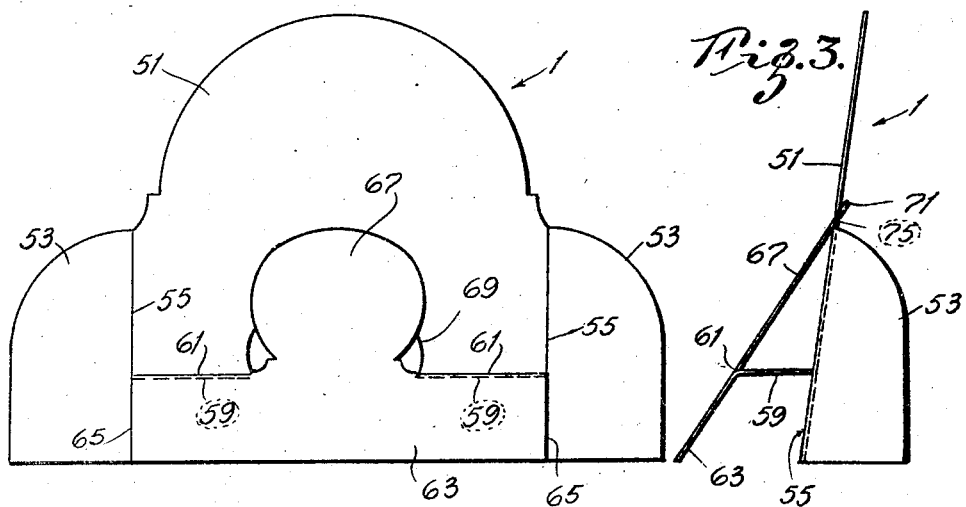

Dec. 28, 1926.
F. D. BARNES
DISPLAY DEVICE
Filed Feb. 23, 1926  2 Sheets-Sheet 2
1,612,691
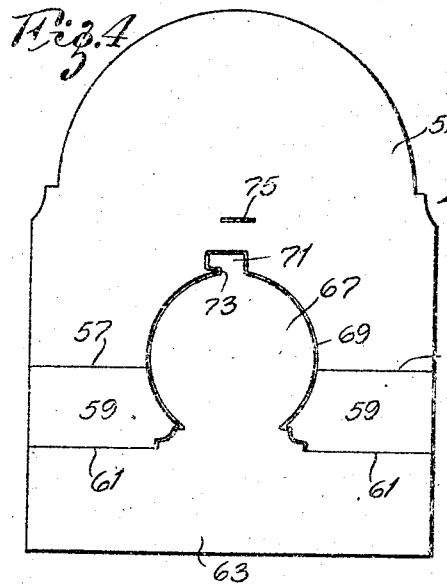
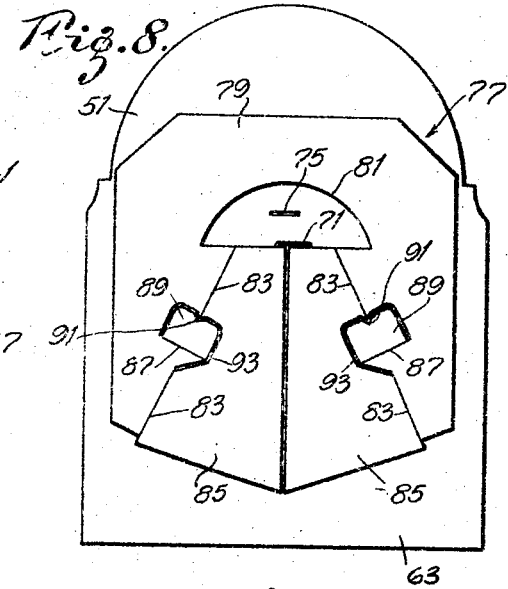
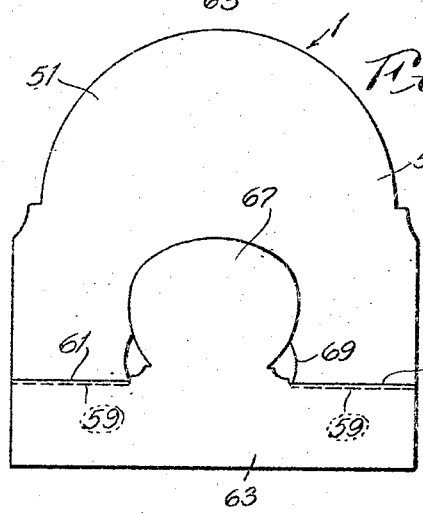
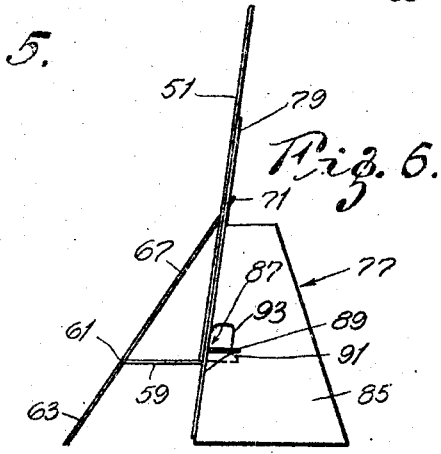
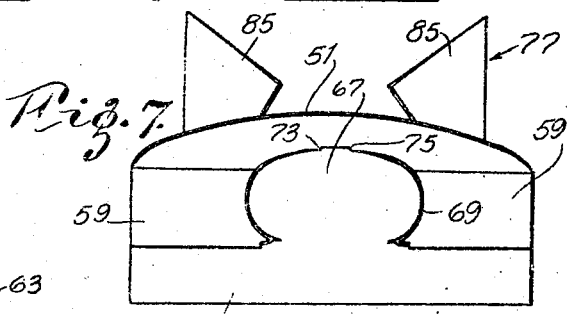
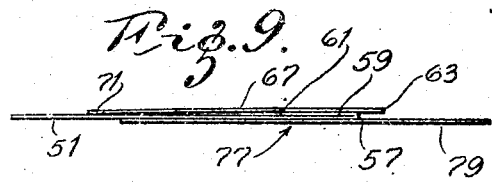

Patented Dec. 28, 1926.

1,612,691

UNITED STATES PATENT OFFICE.

FRED D. BARNES, OF CHICAGO, ILLINOIS, ASSIGNOR TO L. R. CONWELL, OF JACKSON HEIGHTS, NEW YORK.

DISPLAY DEVICE.

Application filed February 23, 1926. Serial No. 89,857.

This invention relates to advertising devices, and with regard to certain more specific features, to a representation of an object or the like, and a display support therefor.

Among the several objects of the invention may be noted the provision of a simple and inexpensive device for displaying in perspective a representation of an object or the like, together with suitable legends; the provision of a strikingly attractive device of this type which can be made from a single blank and shipped flat; and the provision of a device of the class described which is adapted to positively retain itself in proper angular relationship of parts so that it may be relied upon not to change its shape after a mounting thereof, said mounting not requiring a fine degree of manipulation in order to produce a highly successful resultant display. Other objects will be in part obvious and in part pointed out hereinafter.

The invention accordingly comprises the features of construction, combinations of elements and arrangements of parts, which are exemplified in the description hereinafter in connection with the accompanying drawings, and the scope of the application of which will be indicated in the following claims.

In the accompanying drawings, in which are illustrated two of various possible embodiments of the invention—

Fig. 1 is a face view of one form of the device, shown flat;

Fig. 2 is a front elevation of the device, shown in mounted or assembled position for display;

Fig. 3 is a side elevation of Fig. 2;

Fig. 4 is a view similar to Fig. 1, showing a modified form of the device;

Fig. 5 is a view similar to Fig. 2, showing said modified form;

Fig. 6 is a view similar to Fig. 3, showing said modified form;

Fig. 7 is a top plan view of Fig. 5;

Fig. 8 is a rear view of the modified form of the device folded flat; and

Fig. 9 is a side elevation of a modified form, shown folded for shipping.

Similar reference characters indicate corresponding parts throughout the several views of the drawings.

Referring now more particularly to Figs. 1 to 3, there is illustrated a central background panel 51 having sideward wings 53 formed therewith along score lines 55. Hinged downwardly to the central portion 51, by means of score lines 57 is an intermediate shelf panel 59. This panel 59 has diate shelf panel 59. This panel 59 has downwardly hinged thereto, by means of score lines 61, a bracing panel 63. The panels 59 and 63 are relieved from the sideward wings 53 by means of gashes 65.

Formed with and in the plane of the bracing panel 63 is a central display panel 67, which in the manufacturing of the device, is die cut from the material of the portions 51 and 59 by means of a gash 69. The gash 69 is of any shape such as may suit a designer's fancy and the score lines 57 and 61 are adapted to reach to said gash 69. The display panel 67 is provided at its upper edge with a tongue 71 having a notch 73 cut on one side thereof. This tongue 71 is adapted to cooperate with an offset slot 75, which is cut into the portion 51 at some distance above the tongue 71.

To set this device up for display purposes it is only necessary to push the display panel forwardly and to engage the tongue 71 with the slot 75. The result illustrated in Figs. 2 and 3 is thus attained, wherein the display panel 67 is aligned with the bracing panel 63, and is set angularly with regard to the central portion 51, and the shelf panel 59 forms a more or less horizontal shelf upon which objects may be mounted for display, if desired. This described modification has all the advantages of the previous forms accruing thereto, and has a further advantage that one more display plane and support is provided upon which objects may be rested. It is advantageous from an advertising standpoint to have an actual object displayed; about which object display are grouped enticing illustrations and advertising matter with regard thereto. The form shown in Figs. 1 to 3 requires only die cutting and lithographing operations for the manufacture thereof. It is formed of a single piece of material.

Although the above described form of the present invention is adapted to be cut from a single piece of material, it is to be understood that more pieces of material may be used if desired. For instance, if it is desired to dispense with the sideward display wings, such as wings 7, 33 and 53 of the previous form, it may then be of an advantage to provide a glued easel to the device for supporting purposes. Such a construction is shown in Figs. 4 to 9.

In Figs. 4 to 9 the central portion 51 of the previous form is retained, as are the panels 59, 63, and 67 as well as the score lines 57 and 61 and the other parts as illustrated by corresponding numerals, except that the sideward wings have been left off of the device. In order to support the device for display purposes the easel 77 is provided.

The easel 77 comprises a flat portion 79 glued to the back of the central portion 51 and having an aperture 81 therein to form clearance for the operations of the tongue 71 in the slot 75. Hinged to the flat portion 79 of the easel, by means of score lines 83 are two bracing wings 85, which are adapted to fold against or away from the flattened display device. Hinged to the said portion 79 by means of the score lines 87 are two tongues 89. These tongues are provided with notches 91 for purposes of cooperating with the flat material of the braces 85, that is, at a notch 93 formed in said material. The drawings illustrate how the notch 93 is formed by cutting from braces 85 the material required for the tongues 89.

In order to assemble the device shown in Figs. 4 to 7, it is only necessary to cause co-operation between the tongues 71 and the slots 75 as hereinbefore described. This action puts the display portion of the device into operative position. In order to brace it, it is only necessary to draw the easel wings 85 rearwardly, and bend the small wings 89 downwardly until the notches 91 cooperate with the notches 93. By this means the wings 85 are held in a predetermined position for steadying the display. It is to be understood that by properly proportioning the sizes of the parts 51, 59, 63 and 67, that the display portion per se (without the easel or wing portions) may be made to stand alone, that is, its center of gravity may be thrown so that its vertical projection falls within the base limits of the device, whereby inherent stability can be maintained without the use of easels or wings as was done in the two first described forms.

In Fig. 9 is illustrated a folded shipping position of the last-named form in which the display portion 67 has been drawn upwardly against the central portion 51. This operation has rotated the shelf panel 59 over against the said portion 51 and brought the bracing panel 63 down on the said panel 59. The easel 77 is of course in a flattened position such as illustrated in Figs. 8 and 9. It is to be understood that the manner in which the display portions are folded for shipping in this form applies to the previous form, except that in said previous form the wings 53 are folded backwardly or forwardly against the portion 51. If desired, any form of the device may be shipped with the background, display and bracing panels left flat. Hence, where thick material is used, less strain is put on the scored hinges.

The articles of both types herein illustrated may be shipped flat, and may be readily folded into shape, for use by comparatively unskilled labor.

From the above it will be seen that the several objects of the invention are attained and other advantageous results attained.

As many modifications of the embodiments above illustrated might be made without departing from the spirit or scope of the present invention, it is intended that the above description and accompanying drawings and claims shall be interpreted as illustrative and not in a limiting sense.

I claim:

1. An advertising device comprising a background portion, a shelf panel hinged thereto, a bracing panel hinged to the shelf panel, a display portion formed in the plane of said bracing panel and of material taken from the back-ground portion and said shelf panel, and means for interlocking the display panel with the background portion to hold the device in a predetermined position.

2. An advertising device comprising a background portion, a shelf panel hinged thereto, a bracing panel hinged to the shelf panel, a display portion formed in the plane of said bracing panel and of material taken from the background portion and said shelf panel, and means for interlocking the display panel with the background portion, to hold the device in a predetermined position and wings hinged to said background portion.

3. An advertising device comprising a background portion, a shelf panel hinged thereto, a bracing panel hinged to the shelf panel, a display portion formed in the plane of said bracing panel and of material taken from the background portion and said shelf panel, and means for interlocking the display panel with the background portion to hold the device in a predetermined position, and an easel formed with said background portions for bracing the device.

4. An advertising device comprising a background portion, a shelf panel hinged thereto, a bracing panel hinged to the shelf panel, a display portion formed in the plane of said bracing panel and of material taken from the background portion and said shelf panel, means for interlocking the display panel with the background portion, and an easel formed with said background portion for bracing the device, said easel comprising a flat portion adapted to be fastened to the background portion, braces hingedly formed therewith, means for holding the braces in a bracing position, and means for folding all portions of said easel flat against the background portion.

In testimony whereof, I have signed my name to this specification this 19th day of February, 1926.

FRED D. BARNES.